(12) United States Patent
Sun et al.

(10) Patent No.: US 7,675,435 B2
(45) Date of Patent: Mar. 9, 2010

(54) SMART FILTERING WITH MULTIPLE SIMULTANEOUS KEYBOARD INPUTS

(75) Inventors: Ray Sun, Issaquah, WA (US); Timothy M. Thairu, Kirkland, WA (US); Kelly Gachet, Redmond, WA (US); Juan Jose Mejia, Monroe, WA (US); Timothy L. Bui, Bothell, WA (US); Peter Deng, Mountain View, CA (US); Aaron Filner, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 860 days.

(21) Appl. No.: 11/513,562

(22) Filed: Aug. 31, 2006

(65) Prior Publication Data

US 2008/0068226 A1 Mar. 20, 2008

(51) Int. Cl.
*H03K 17/94* (2006.01)
*H03M 11/00* (2006.01)

(52) U.S. Cl. ............................ 341/22; 345/168; 700/84; 710/67; 719/321; 719/328

(58) Field of Classification Search ................. 341/22, 341/26; 345/168; 700/84; 710/67; 719/321, 719/328
See application file for complete search history.

(56) References Cited

U.S. PATENT DOCUMENTS

| | | | | |
|---|---|---|---|---|
| 5,631,643 A | * | 5/1997 | Hisamori et al. | 341/23 |
| 5,847,954 A | * | 12/1998 | Beard et al. | 700/84 |
| 5,973,675 A | * | 10/1999 | Joto et al. | 345/168 |
| 6,377,965 B1 | | 4/2002 | Hachamovitch et al. | 707/534 |
| 6,429,793 B1 | * | 8/2002 | Paolini | 341/22 |
| 6,456,277 B1 | * | 9/2002 | Satoh et al. | 345/168 |
| 6,512,467 B1 | * | 1/2003 | Hanko et al. | 341/22 |
| 6,556,841 B2 | | 4/2003 | Yu | 455/556 |
| 6,799,303 B2 | | 9/2004 | Blumberg | 715/534 |
| 6,988,990 B2 | | 1/2006 | Pan et al. | 600/437 |
| 7,030,863 B2 | | 4/2006 | Longe et al. | 345/173 |
| 2003/0036411 A1 | | 2/2003 | Kraft | 455/566 |
| 2004/0140956 A1 | | 7/2004 | Kushler et al. | 345/168 |
| 2008/0154576 A1 | * | 6/2008 | Wu et al. | 704/2 |

FOREIGN PATENT DOCUMENTS

EP 1452951 A1 4/2006

OTHER PUBLICATIONS

"PDAmedia Keyboard V 2.0—The way of typing -," PDAmedia Keyboard V2.0 user manual, 2004 © PDAmedia.biz, pp. 1-20. http://www.pdamedia.biz/download/help/kbdv20/kbdhelp.pdf.
Harbusch, Karin; Kühn, Michael; "An Evaluation Study of Two-Button Scanning With Ambiguous Keyboards,"pp. 1-6. http://www.uni-koblenz.de/~harbusch/harbusch-kuehn-aaate-2003.pdf.

* cited by examiner

*Primary Examiner*—Timothy Edwards, Jr.
(74) *Attorney, Agent, or Firm*—Merchant & Gould (57) ABSTRACT

Keyboard entries by users are tracked and filtered to reduce ambiguity in translating the entries to characters and predicting text based on the entries in a multiple keyboard environment. Key tables such as an equivalence table mapping characters to a base character value, a digit mapping table mapping characters to a digit between 0 and 9 are used to determine possible matches in text prediction. A letter accumulator UI is employed along with a number accumulator UI to provide users feedback on tracked letters.

20 Claims, 8 Drawing Sheets

SMART FILTERING WITH MULTIPLE SIMULTANEOUS KEYBOARD INPUTS

BACKGROUND

Hand held computing devices are used for a wide variety of applications ranging from smart cellular phones to complicated remote control devices. While processing power, memory, and other features of such devices are being improved with developing technologies, the challenges of small size display and input mechanism are more difficult to overcome.

Hand held computing devices may include a hard keyboard (actual keys) or a soft keyboard (a keyboard application on a touch-sensitive display) for user input. Due to size constraints such keyboards are likely to be a reduced keyboard, where multiple functionalities are assigned to individual buttons (keys). These devices typically include an Application Program Interface (API) or a separate application mapping the physical or virtual keys to characters or commands.

Increasingly, however, hand held devices are being equipped with the capability of operating with multiple keyboards. For example, a smart cellular phone/personal digital assistant (PDA) device may include a reduced or custom hard keyboard, a soft keyboard, a virtual phone pad, and even a connection capability to a standard full size keyboard. While the selection of keyboards may make it easier for the user to use a preferred keyboard type, different mappings between keyboards may make avoiding ambiguity in interpreting keyboard inputs problematic.

It is with respect to these and other considerations that the present invention has been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to managing a plurality of keyboard input systems with different mappings on a computing device. Keyboard entries from multiple keyboards/keypads may be tracked using one or more key mapping tables to determine possible mappings of an entry to characters and text predictions based on the matches. Some tables may be modified to customize the tracking system based on keyboard properties. According to other embodiments, a user interface (UI) may be employed to provide a user feedback on tracked characters and/or character groupings.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, smart filtering in a multiple keyboard environment with different mappings may be implemented using key mapping table(s) where the exact keys pressed by the user are tracked and filtering is performed based on these tracked entries. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Referring now to the drawings, aspects and an exemplary operating environment will be described. Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Throughout this document the terms "digit", "number", and "letter" are used in reference to mapping mechanisms of keyboards and applications. Embodiments are not limited to these, however. Embodiments may be implemented for any alphanumeric characters, special characters, and/or symbols such as $, &, @, and the like.

Figure 1:
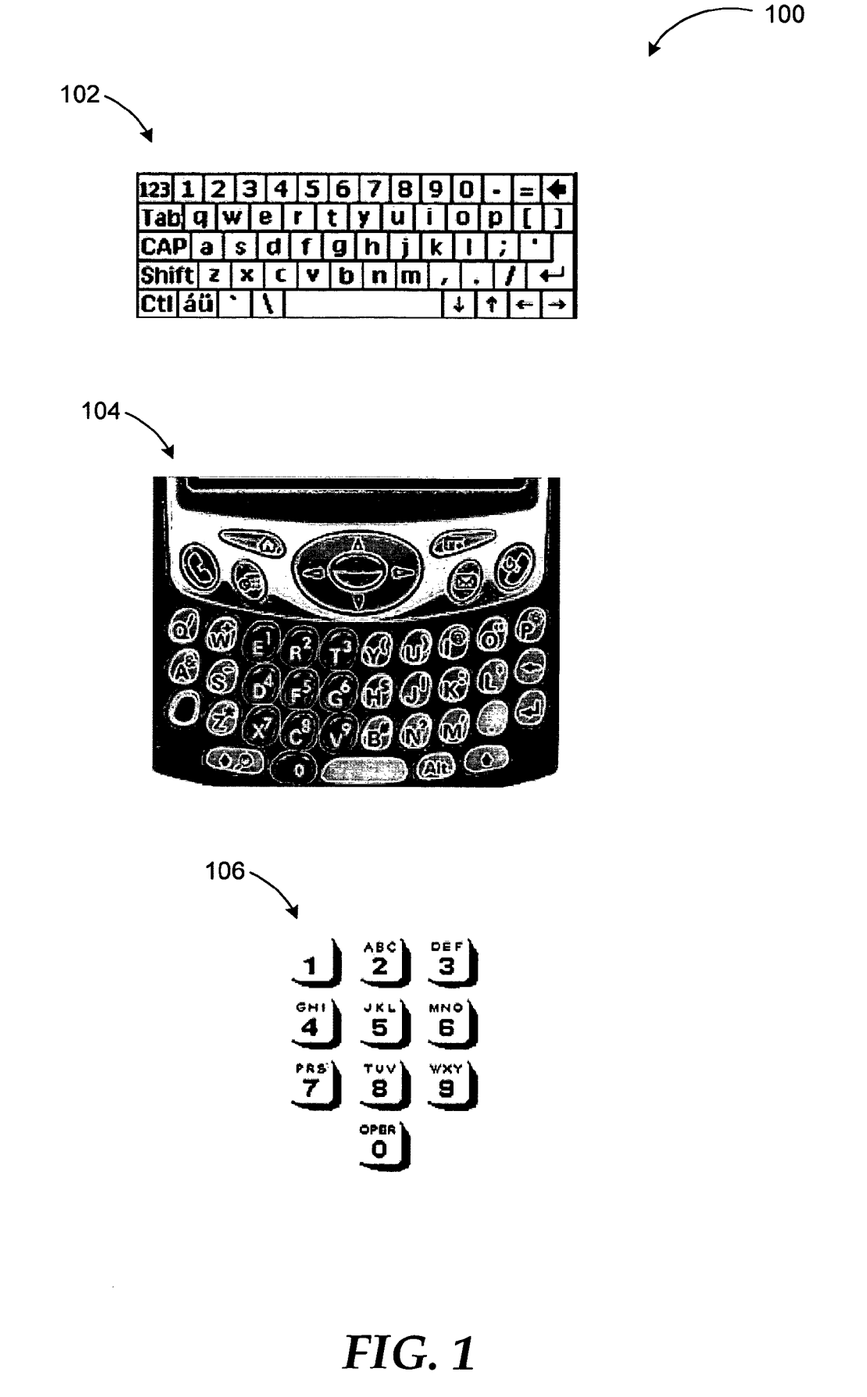
FIG. 1 illustrates three example keyboards with different mapping styles.

FIG. 1 illustrates three example keyboards with different mapping styles. Currently, many computing devices include applications that support intelligent filtering of long lists through typing. For example, typing the letters "J", "o", and "e" prompts the application to find a contact with the first name Joe and use the information for selected purpose(s). The letter entries may be as letters or as corresponding numbers, such as on a phone keypad. Depending on a device type, different keyboard types may be used for typing the information. Some keyboards are non-ambiguous, meaning each key corresponds to a single character. Other keyboards may have some of the keys corresponding to two characters. Yet other keyboards may have at least a portion of the keys associated with two or more characters.

Keyboard 102 is an example of a non-ambiguous keyboard, also referred to as 0 LPN (zero letters per number). The letters of a standard QWERTY keyboard are an example of such a keyboard. Increasingly, virtual 0 LPN keyboards are being used in PDAs.

Keyboard 104 is an example of a 1 LPN (one letter per number) keyboard. Some PDAs and smart cellular phone devices utilize this type of keyboard, in which each key maps to one special character (symbol) or number and one letter.

Keyboard 106 is an example of a 2+ LPN (two or more letters per number) keyboard. A 12-key telephonic keypad is a classic example of such keyboards, where three letters are mapped for each key in addition to a number.

Operating with a single keyboard is fairly straight forward using a mapping table or similar mechanism. The challenge is when multiple types of keyboards are operated on a single device. These cases may lead to ambiguity in the filtering string, which in turn may result in user confusion about how the list is being filtered.

For example, a PC-based PDA/communication device may include an on-screen keypad that mimics the traditional 12-key telephonic keypad (2+ LPN), a separate on-screen QWERTY style keyboard (0 LPN), and a hardware QWERTY keyboard with an overlapping number pad (1 LPN). In this case, a user may hit the 2abc key on the (2+ LPN) keyboard, then the 2e key on the 1 LPN, and then the 2 key on the 0 LPN. Under a standard algorithm, the user may simply see 222 as the filter string. This may lead to the ambiguity of which letters are being filtered by the 3 keys that have been pressed, and how can the user be informed about the filtering. Furthermore, there is a possibility that even more keyboards may be added to the device with other letter to number mappings (e.g. an external Bluetooth keyboard).

Figure 2:
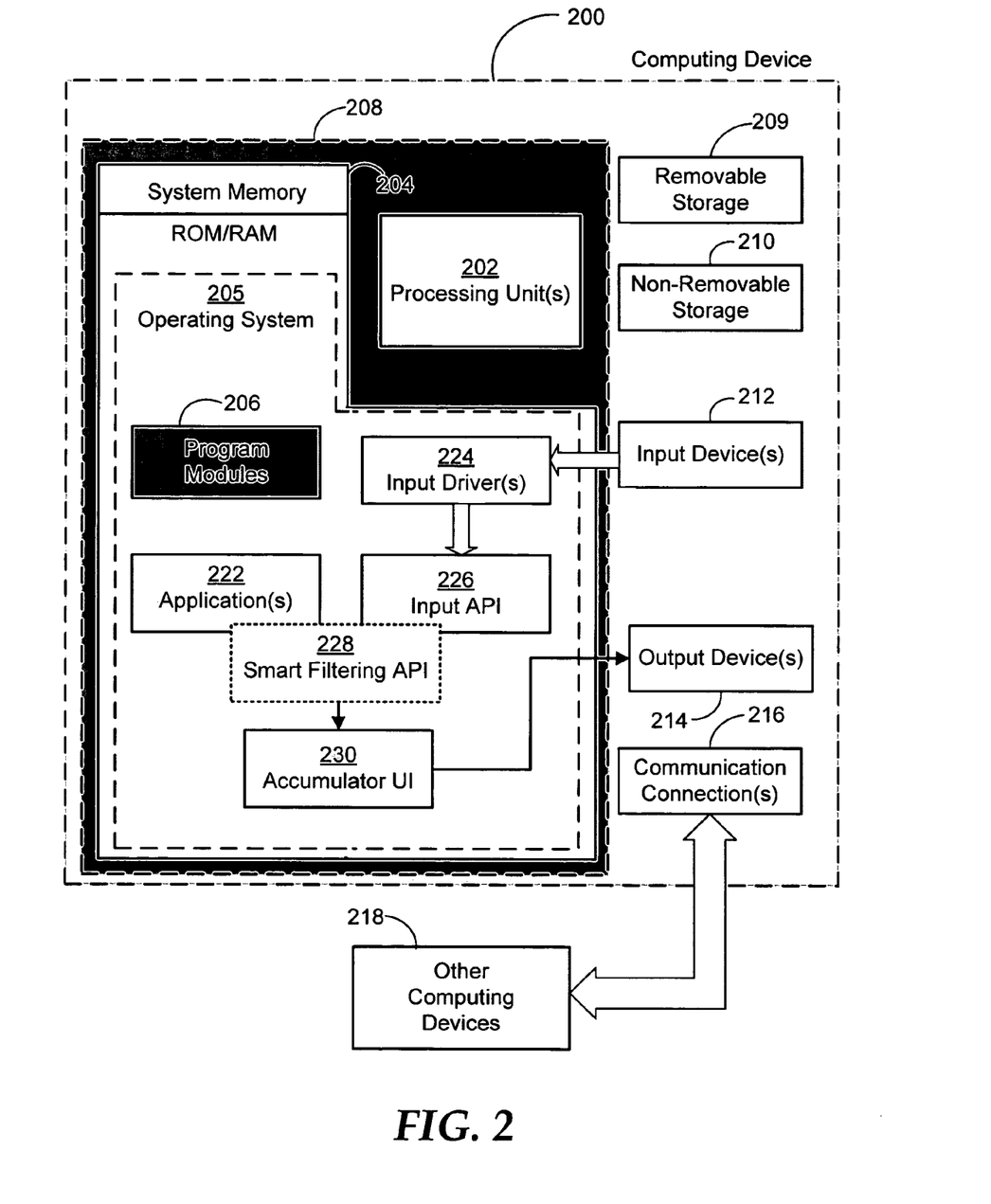
FIG. 2 is a block diagram of an example computing operating environment.

The below discussion associated with FIG. 1 and FIG. 2 is intended to provide a brief, general description of a suitable computing environment in which the invention may be implemented. While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

With reference to FIG. 2, one example system for implementing the embodiments includes a computing device, such as computing device 200. In a basic configuration, the computing device 200 typically includes at least one processing unit 202 and system memory 204. Computing device 200 may include a plurality of processing units that cooperate in executing programs. Depending on the exact configuration and type of computing device, the system memory 204 may be volatile (such as RAM), non-volatile (such as ROM, flash memory, etc.) or some combination of the two. System memory 204 typically includes an operating system 205 suitable for controlling the operation of a networked personal computer, such as the WINDOWS® operating systems from MICROSOFT CORPORATION of Redmond, Wash. The system memory 204 may also include one or more software applications such as program modules 206, applications 222, input driver(s) 224, input API 226, smart filtering API 228, and accumulator UI 230.

Input drivers 224 are typically associated with individual input devices such as different keyboards. Essentially, input drivers 224 translate user inputs such as pressed keys to signals that can be processed by the computing device 200. Input API 226 is an interface module between an application (e.g. one of applications 222) and the input drivers 224. In a conventional system with a single keyboard, Input API 226 directs the input signals from input device 212 translated with the help of an input driver 224 to an application 222. In the case of multiple, simultaneous keyboards with different mappings, smart filtering API 228 is employed to track the key inputs and enable filtering for entries from different keyboards. Smart filtering API 228 may be a separate module or it may be an integrated part of applications 222.

Input devices associated with input drivers 224 may include any type and style keyboard or keypad ranging from QWERTY style, full size keyboards to custom style, reduced keyboards to digits only keypads.

According to some embodiments, accumulator UI 230 may be employed to provide the user feedback about which characters are being matched. The accumulator UI 230 may be implemented along with a number accumulator UI such as the display of a cellular phone showing the dialed numbers. Applications 222, input driver(s) 224, input API 226, smart filtering API 228, and accumulator UI 230 may communicate between themselves and with other applications running on computing device 200 or on other devices. Furthermore, either one of applications 222, input driver(s) 224, input API 226, smart filtering API 228, and accumulator UI 230 may be executed in an operating system other than operating system 205. This basic configuration is illustrated in FIG. 2 by those components within dashed line 208.

The computing device 200 may have additional features or functionality. For example, the computing device 200 may also include additional data storage devices (removable and/or non-removable) such as, for example, magnetic disks, optical disks, or tape. Such additional storage is illustrated in FIG. 2 by removable storage 209 and non-removable storage 210. Computer storage media may include volatile and non-volatile, removable and non-removable media implemented in any method or technology for storage of information, such as computer readable instructions, data structures, program modules, or other data. System memory 204, removable storage 209, and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 200. Any such computer storage media may be part of device 200. Computing device 200 may also have input device(s) 212 such as keyboard, mouse, pen, voice input device, touch input device, etc. in addition to those discussed above. Output device(s) 214 such as a display, speakers, printer, etc. may also be included. These devices are well known in the art and need not be discussed at length here.

The computing device 200 may also contain communication connections 216 that allow the device to communicate with other computing devices 218, such as over a network in a distributed computing environment, for example, an intranet or the Internet. Communication connection 216 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing device 200 may be embodied as a hand held computing device such as a PDA, a smart phone, and the like, that may be used to communicate over a network such as a cellular network or a wireless LAN network. Embodiments are not limited to cellular or similar communications based usage, however. Other embodiments may include, but are not limited to, remote control devices for cable systems, computers, presentation systems, and the like.

Figure 3:
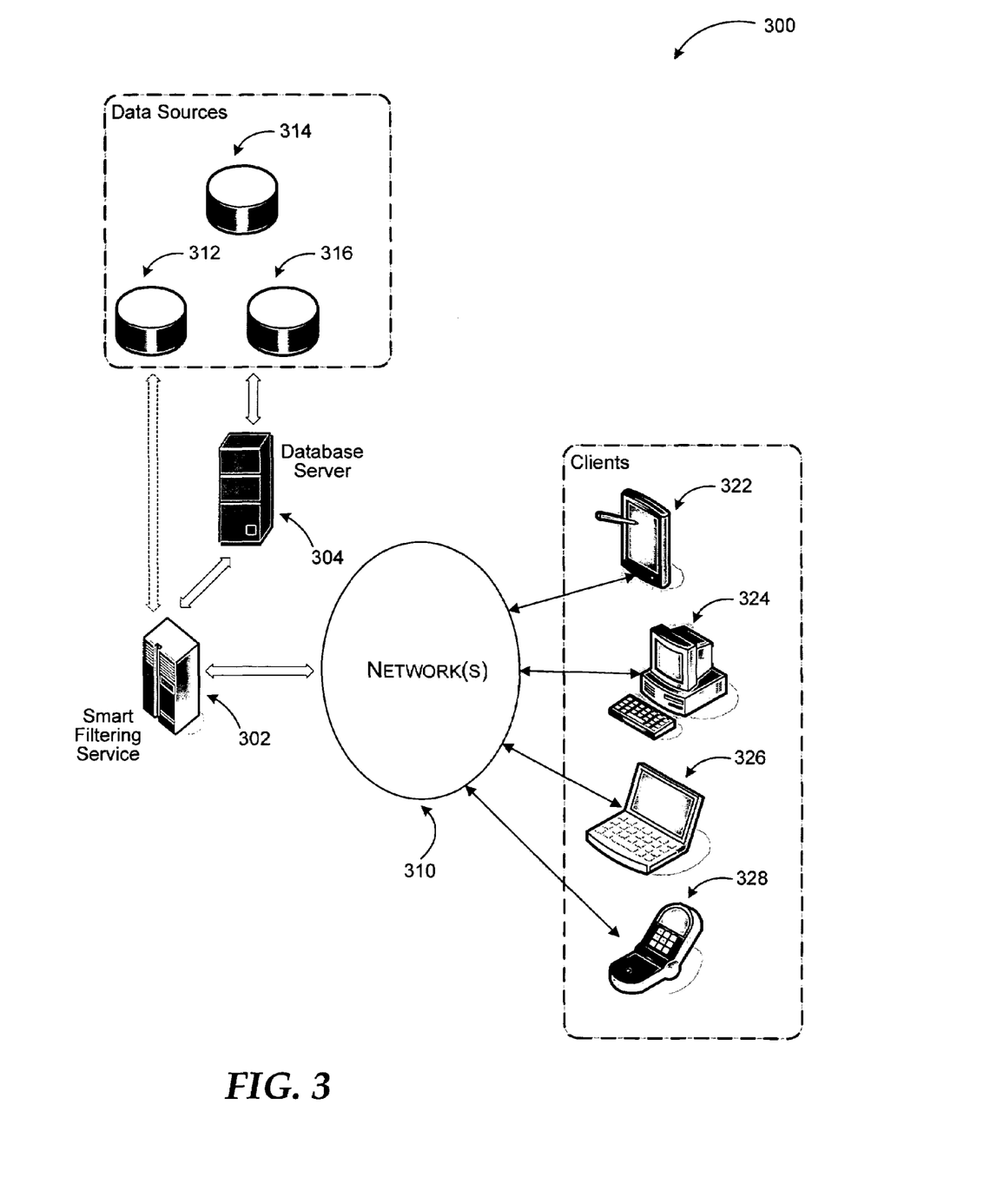
FIG. 3 illustrates a networked system where example embodiments may be implemented.

Referring to FIG. 3, a networked system where example embodiments may be implemented, is illustrated. System 300 may comprise any topology of servers, clients, Internet service providers, and communication media. Also, system 300 may have a static or dynamic topology. The term "client" may refer to a client application or a client device employed by a user to perform operations associated with an adaptation system. While the smart filtering system may include many more components, relevant ones are discussed in conjunction with this figure.

Smart filtering service 302 and database server 304 may be one or more programs or a server machine executing programs associated with the smart filtering tasks. Similarly, data sources may include one or more data stores.

A multiple keyboard support system may be run on a server or a client machine connected to network(s) 310 and use smart filtering service 302 to track user inputs from various keyboards with different character mappings. Smart filtering service 302 may receive entries or modifications to its key mapping tables from data sources 312, 314, or 316 directly or through database server 304. The data sources may include data stores where custom key table entries and other information such as input drivers for keyboards may be stored. The same or similar information may also be received from client devices 322-328 to smart filtering service 302. Data sources may include SQL servers, databases, non multi-dimensional data sources, file compilations, data cubes, and the like. Database server 304 may manage the data sources.

Smart filtering service 302 is configured to provide keyboard entry tracking and filtering service to applications on client devices 322-328. In some embodiments, smart filtering service 302 may perform these tasks remotely through network 310. In other embodiments, smart filtering service 302 may simply provide a custom smart filtering API to the client devices based on their keyboard configuration(s).

Client devices 322-328 are any computing device that can operate one or more keyboards with various mapping configurations. Client devices 322-328 may communicate over network(s) 210 with smart filtering service 302 or other computing devices.

Network(s) 310 may include a secure network such as an enterprise network, or an unsecure network such as a wireless open network. Network(s) 310 provide communication between the nodes described above. By way of example, and not limitation, network(s) 310 may include wired media such as a wired network or direct-wired connection, and wireless media such as acoustic, RF, infrared and other wireless media.

Many other configurations of computing devices, applications, data sources, data distribution and analysis systems may be employed to implement a smart filtering system with multiple simultaneous keyboard inputs.

Referring still to FIG. 2 and FIG. 3, the ambiguity resulting from use of multiple keyboards with different mappings may be substantially reduced, according to some embodiments, by implementing a key mapping table where the exact keys pressed by the user are tracked and filtering is performed based on these tracked entries.

According to other embodiments, Independent Hardware Vendors (IHVs) or Independent Software Vendors (ISVs) may be enabled to add to, remove from, and modify the key table. As a result, filtering algorithm(s) may be executed with any keyboard including ones that are added to or removed from the computing device after its initial set up.

According to further embodiments, a letter accumulator user interface (UI) may be implemented along with a number accumulator UI to display which characters are being matched in the list. A detailed example of the UIs and their use is given in conjunction with FIG. 5.

Figure 4A:
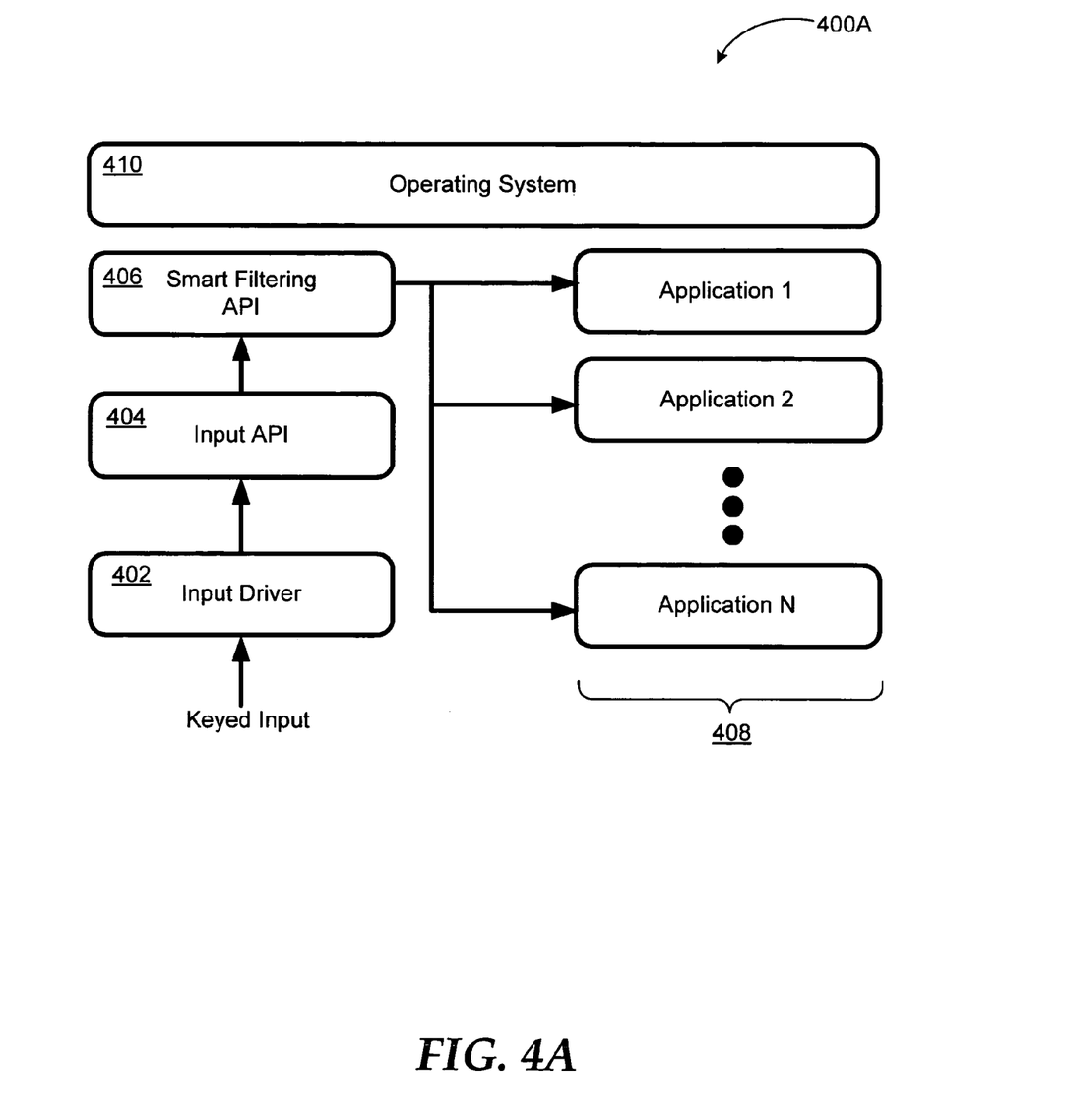
FIG. 4A illustrates an example architecture of a smart filtering system for multiple keyboards with different mappings according to embodiments.

FIG. 4A illustrates an example architecture of a smart filtering system for multiple keyboards with different mappings according to embodiments. Architecture 400A may have a static or dynamic topology.

According to the architecture, a user's input through a keyboard or keypad is translated employing an input driver 402. Next, input API 404 provides an interface between the input sub-system and one of applications 1-N (408). In one embodiment, smart filtering API 406 operates between input API 404 and applications 408 to provide tracking and filtering capability for the keys pressed by the user such that an ambiguity resulting from use of multiple keyboards with different mappings is substantially reduced. One or more tables (e.g. equivalence table, dynamic custom table, digit matching table) may be used to map and track corresponding characters and character combinations for each pressed key. Similar to input drivers, IHVs or ISVs may be enabled to add or modify mapping table entries customizing the filtering process for unique keyboard configurations. Furthermore, an accumulator UI may also be controlled by smart filtering API 406 to provide a feedback to the user on tracked character combinations. The drivers, APIs, and applications may all be executed within operating system 410.

Figure 4B:
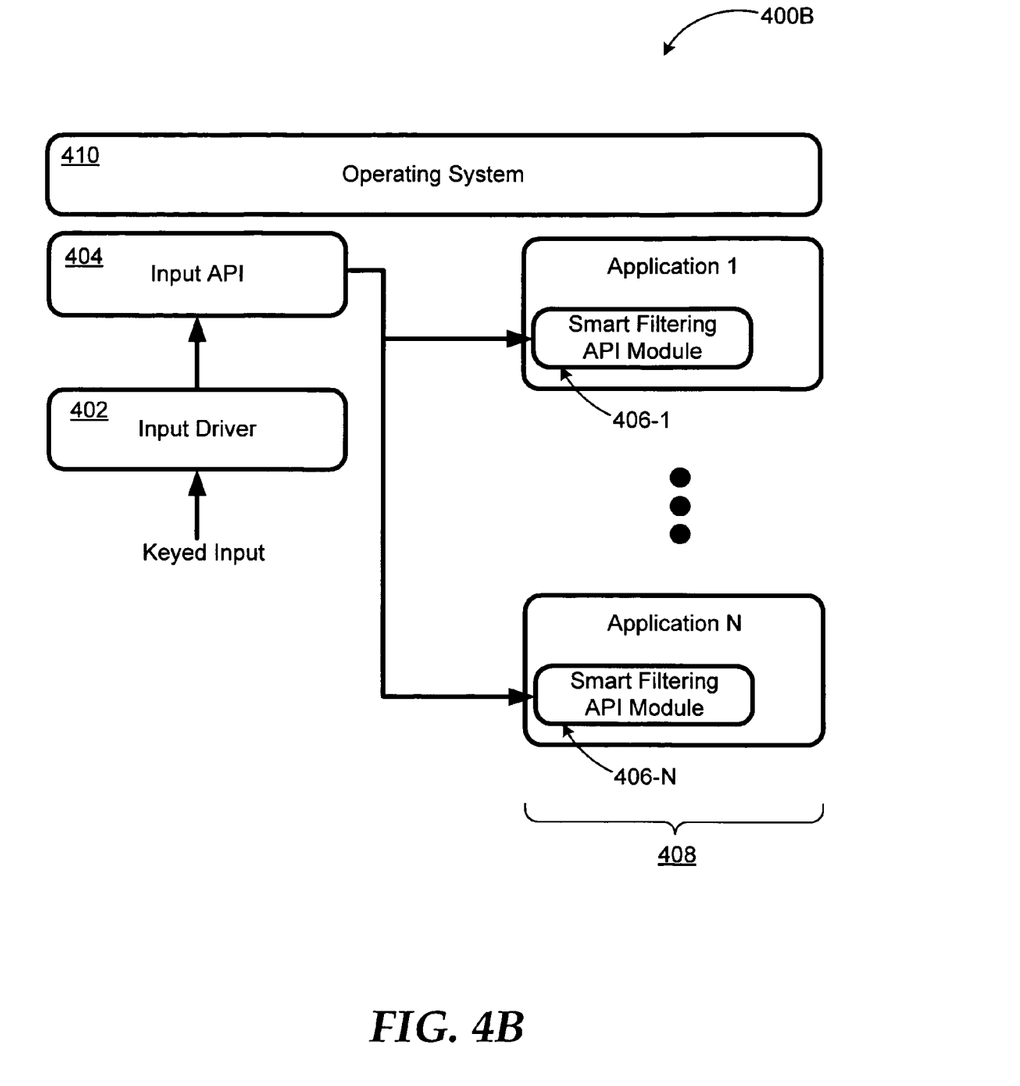
FIG. 4B illustrates another example architecture of a smart filtering system for multiple keyboards with different mappings.

FIG. 4B illustrates another example architecture of a smart filtering system for multiple keyboards with different mappings according to embodiments. Architecture 400B is similar to architecture 400A with input drivers 402, input API 404, an applications 408 operating within operating system 410.

Differently from architecture 400A, in architecture 400B, the smart filtering is performed by individual smart filtering API modules 406-1 through 406-N integrated in each of the applications 408. Thus, the smart filtering modules may be further customized according to each application. For example, application 1 may recognize and accept inputs from three of five available keyboards, while application 2 recognizes and accepts inputs from all five available keyboards.

Operating system 410 provides a framework for the different components of the smart filtering with multiple keyboards system to work within. While the illustration shows all components and the applications under one operating system, various portions of architectures 400A and 400B may be executed in different operating systems.

Components of the smart filtering system such as smart filtering API 406 may be loaded into a server, executed over a distributed network, executed in a client device, and the like. Furthermore, the components described above are for illustration purposes only, and do not constitute a limitation on the embodiments. A smart filtering system with simultaneous multiple keyboards may be implemented using fewer or additional components in various orders. Individual components may be separate applications, or part of a single application. In addition to the accumulator UI, the smart filtering system or its components may include individually or collectively other user interfaces such as a web service, a Graphical User Interface (GUI), and the like, for configuring the system, adding, removing, or modifying key tables.

Figure 5:
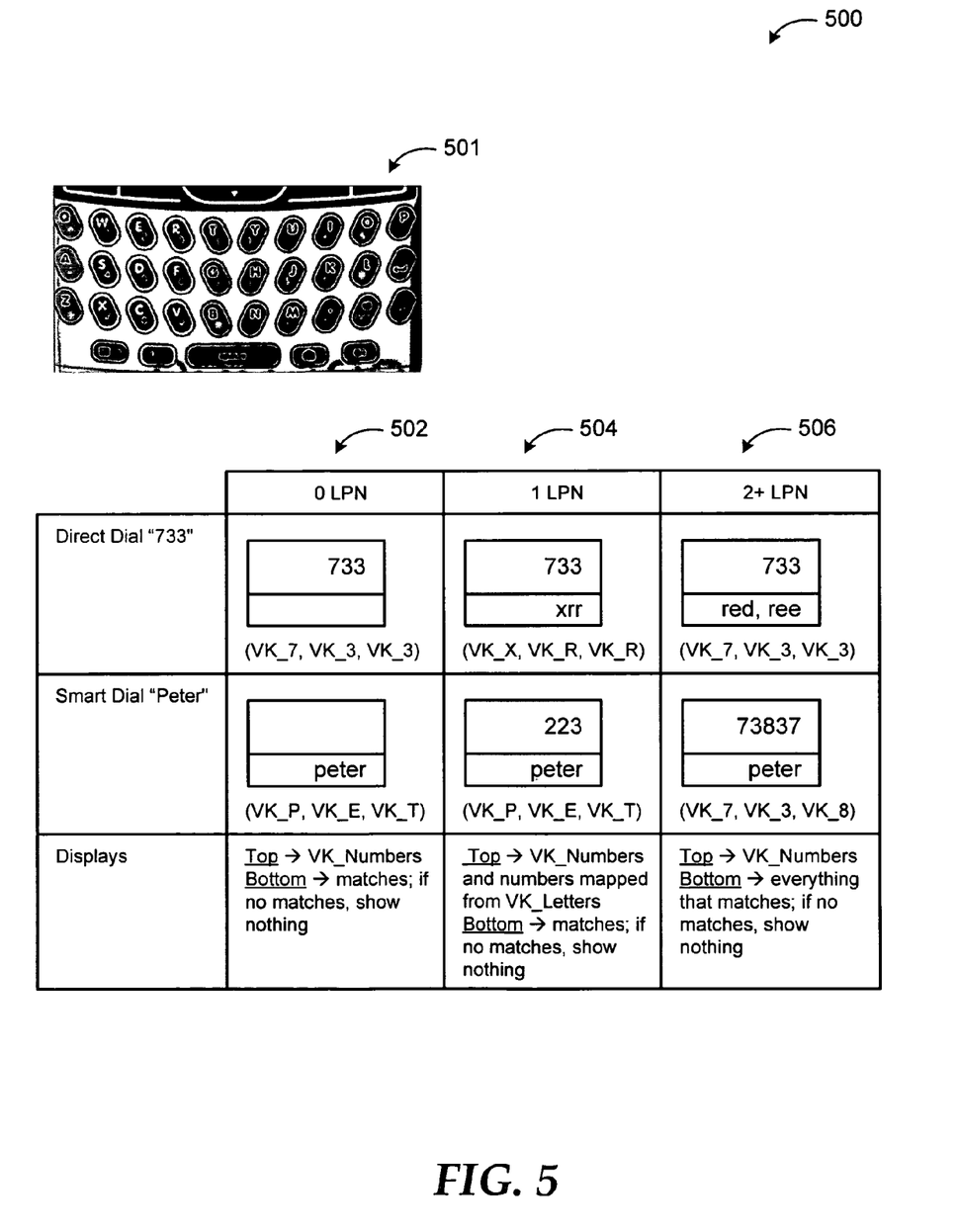
FIG. 5 is a table illustrating differences between different keyboard types and filtering systems employing a number accumulator UI and a letter accumulator UI.

FIG. 5 is a table illustrating differences between different keyboard types and filtering systems employing a number accumulator UI and a letter accumulator UI. The example keyboards are assumed to be soft keyboards and the entries using the keyboards designated as VK_X (virtual key X), X being the assigned character of the virtual key. A keyboard 501 that causes the mappings discussed below is also shown in the figure.

Table 500 includes in the top two rows of column 502 the UIs and entered virtual keys for a non-ambiguous (0 LPN) keyboard; in the top two rows of column 504 the UIs and entered virtual keys for a 1 LPN keyboard; and in the top two rows of column 506 the UIs and entered virtual keys for a 2+ LPN keyboard. The bottom row explains the displayed information on accumulator UIs.

The top row is an example of a direct dial system, where the filtering is performed directly based on the pressed keys. In direct dial system, a 0 LPN keyboard input is recognized and interpreted only as the entered digits, in this example "733". Using a 1 LPN keyboard, the entered digits are mapped to letters with a one-to-one mapping scheme. In the example scenario, digits "733" are mapped to "xrr". In case of the 2+ LPN keyboard, the entered digits may be mapped to more than one letter. Thus, multiple letter groupings may be tracked as shown in the letter (secondary) accumulator UI. In the example scenario of the figure, the tracked possible letter groupings are "red" and "ree".

The second row illustrates using the same three keyboard types in a smart dial system, where names are matched to a list (e.g. contacts list). In all three example scenarios, the name to be matched is "Peter". Because a 0 LPN keyboard has no mappings from digits to letters, the primary (number) accumulator UI display is blank in column 502 second row. For 1 LPN keyboard, the entered keys for a successful match may be "223". For a 2+ LPN keyboard, the number of key entries matches the number of letters in the matched name (5). The primary accumulator shows "73837" which maps to "peter" shown in the secondary accumulator display.

According to some embodiments, a smart filtering system may be employed to select contact names that match a user input. For each contact name that matches (contact name is normally a combination of first name and last name in first <space> last or last, <space> first order), a portion of the name that is the reason for the match ("matching reason") is calculated and stored in a secondary accumulator (letter accumulator) data structure. The data structure may include n arrays of characters, $a_1 \ldots a_n$, where $a_x$ stores a list of matching reasons for user input of length x.

For each section of the contact name that matches the user input, the starting character of the matching section, the number of characters that match within the section, the part of the user input that causes the match, and the number of characters from the user input that cause the match may be tracked.

With this data, an array of integers may be generated, which maps each character of the user input to each character in the matching reason of the contact name. Using this integer array, the characters from the matching reason of the contact name may be added to the secondary accumulator data structure in the order in which the user input matched them. If this new match is similar to a previous match caused by the same user input, it is discarded and only one copy of the matching reason displayed. If there is any change in key mapping during matching, previous matches may be deleted and recalculate all the matching reasons recalculated.

The secondary accumulator data structure allows for efficiency optimization when the user has entered x characters (with all the matches currently stored in arrays $a_1 \ldots a_x$) and deletes the $x^{th}$ input character. In that case a recalculation of the matches for the remaining x−1 characters of input is not needed, since the $a_{x-1}$ array of matches can be displayed. The example scenarios below illustrate the use of smart filtering in a contact list. The contact list includes: 1) Doe, Jane; 2) John Smith; and 3) Kim Foe.

According to a first scenario, user input includes: "363", on a 12-key telephonic keypad (i.e. "2" matches ABC, "3" matches DEF, "4" matches GHI, etc.). Matching reasons per contact are: 1) Doe; 2) <none>; and 3) Foe. Secondary accumulator displays: "Doe, Foe".

According to a second scenario, user Input includes "3635" on the 12-key telephonic keypad. Matching reasons per contact are: 1) Doe J; 2) <none>; and 3) Foe K. Secondary accumulator displays "Doe J, Foe K".

According to a third scenario, user input includes: "5463" on the 12-key telephonic keypad. Matching reasons per contact are: 1) <none>; 2) <none>; and 3) Kim F. Secondary accumulator displays "Kim F".

Figure 6:
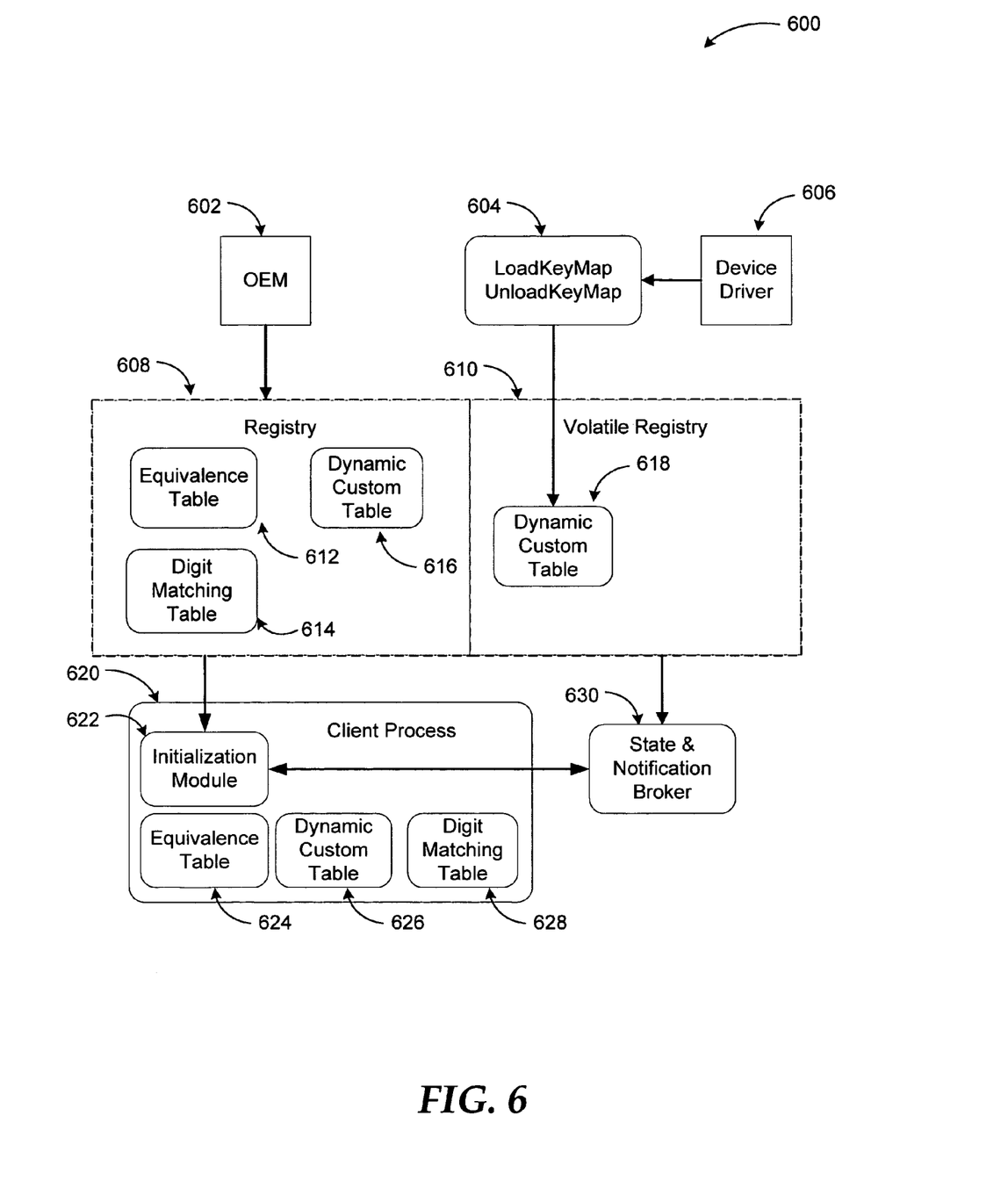
FIG. 6 is a block diagram illustrating customization of key mapping tables in a smart filtering system.

FIG. 6 includes block diagram 600 illustrating customization of key mapping tables in a smart filtering system. According to some embodiments, three key mapping tables may be used to track which characters match a given key input: an Equivalence Table, a Digit Matching Table, and a Dynamic Custom Table. However, embodiments are not limited to these tables. Other tables such as local specific tables or language specific tables may also be utilized.

The equivalence table is used to map characters to a base character value. For example, the equivalence table may map all of the following characters, "ÀÁÂÃÄÅÆàáâãäåæa", to the base character value "A". The equivalence table may also be used to map local specific characters to a corresponding digit key that the character is drawn upon. For example, the Greek character "Σ" may map to "7" because "Σ" is drawn on the "7" key on a Greek 12-key device.

The digit matching table is used to map characters to the digits 0 through 9. For example, the characters "AaBbCc" could be specified to map to "2". A typical keyboard associated with this table is the 12-key telephonic keypad.

The dynamic custom table is used to map equivalenced (already mapped by the equivalence table) characters to alternate characters. The table is dynamic because it can be updated at anytime. It is custom because it can be defined by external parties. The dynamic custom table maps equivalenced characters in order to reduce the number of mappings that need to be tracked (e.g. the characters mapped to by "A" are also mapped to by "ÀÁÂÃÄÅÆàáâãäåæa"). The dynamic custom table maps equivalenced characters to alternate characters in order to support single tap matching based on the characters that are actually drawn on each key of a selected device.

As mentioned previously, IHVs and ISVs may be enabled to add to, remove from, and modify the key tables. This allows the algorithm to work with arbitrary keyboards, including ones that can be added or removed after an initial setup of the computing device.

External parties may customize key mappings using designated registry keys specific to each table in the operating system or using custom APIs that are configured to make volatile changes to the registry. A state and notifications broker module may monitor the registry value changes and reinitialize all clients of the key mapping tables whenever one of the tables is changed.

Whenever a new key mapping is needed such as when an external key input device is activated, the device driver for that key input device may call the designated loading API to update the relevant table (e.g. dynamic custom table). The user will then be able to use the new key input device and see appropriate matches found by the smart filtering system. When a key input device is deactivated, the associated driver may call the designated removal API to ensure that the previous key mapping is restored.

Referring to FIG. 6 now, OEM 602 is enabled to set the initial state or modify at least one of equivalence table 612, dynamic custom table 616, and digit matching table 614 in registry 608. Device driver 606 may modify dynamic custom table 618 in volatile registry 610 using APIs 604 such as LoadKeyMap (for activating a newly added keyboard) or UnloadKeyMap (for deactivating a removed keyboard).

Changes in the registry 608 are implemented in client key mapping tables 624, 626, and 628 through client initialization module 622. State and notification broker 630 may monitor changes in the volatile registry and updates client process 620 again through the initialization module 622.

The smart filtering processes, components, examples, and architecture discussed in FIGS. 2 through 6 are for illustration purposes only. Embodiments are not limited to the example applications, modules, or processes. Filtering and tracking user input in a multiple keyboard environment may be provided in many other ways using the principles described herein.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 7:
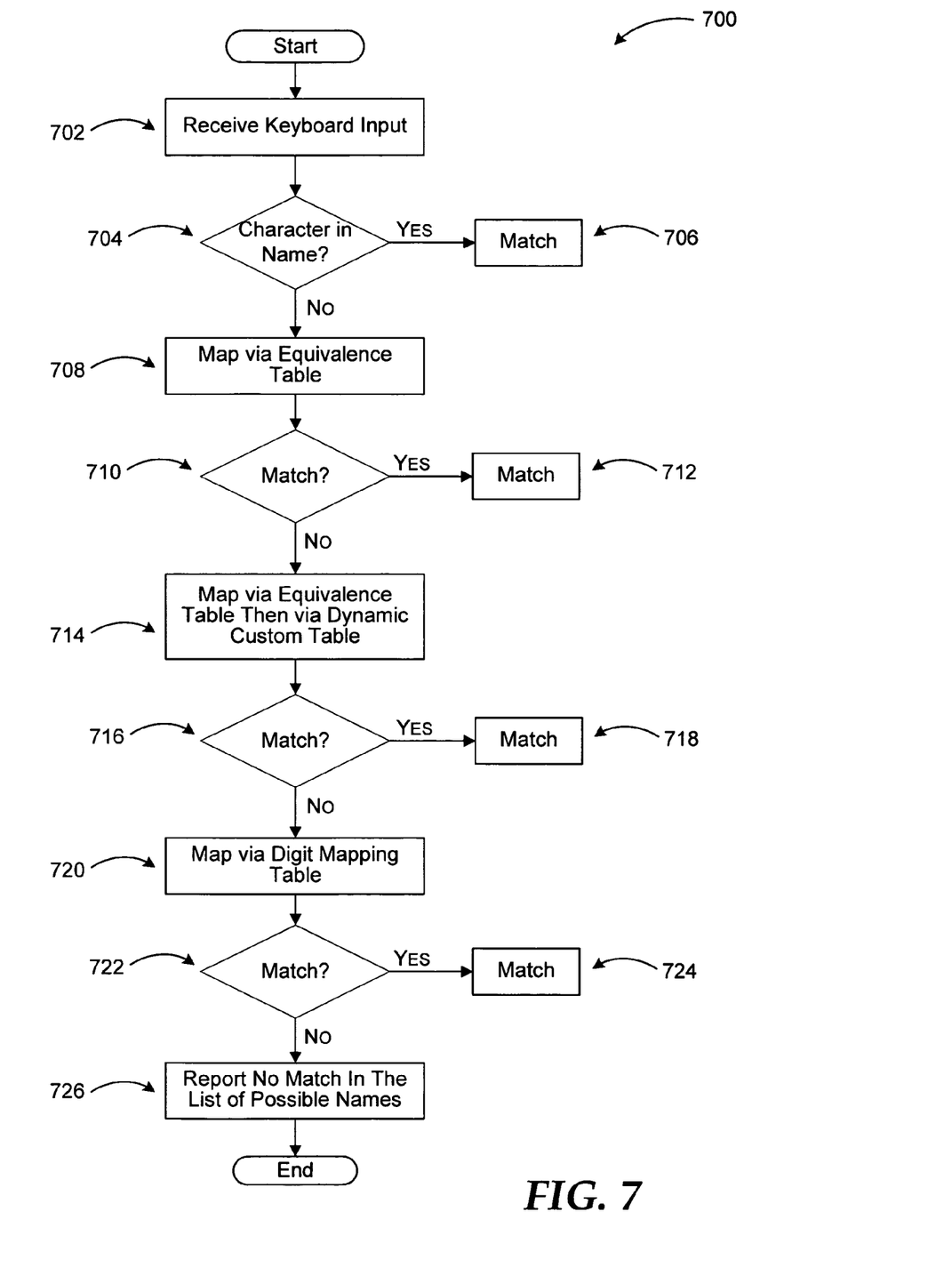
FIG. 7 illustrates a logic flow diagram for a process of matching a received character to a character in a name according to embodiments.

FIG. 7 illustrates a logic flow diagram for a process of matching a received character to a character in a name according to embodiments. Process 700 may be implemented in a smart filtering module, such as the smart filter API 228 of FIG. 2, executed in association with a dialing application.

Process 700 begins with operation 702, where a keyboard input is received. The keyboard input may be a character such as a digit, a letter, and the like. Processing continues from operation 702 to decision operation 704.

At decision operation 704, a determination is made whether the character is in one of the possible names in a dial list. If the character is found to be in one of the names, a match is determined in operation 706. If the character is not found in any of the names, processing moves to operation 708.

At operation 708, the character is mapped via the equivalence table. As described previously, the equivalence table is used to map characters to a base value. Processing advances from operation 708 to decision operation 710.

At decision operation 710, a determination is made whether a match is found based on the mapping using the equivalence table. If the decision is affirmative, a match is recorded in following operation 712. Otherwise, processing moves to operation 714.

At operation 714, the character is mapped via the equivalence and dynamic custom tables. The dynamic custom table is used to map characters, which have already been mapped through the equivalence table, to alternate characters. Processing moves from operation 714 to decision operation 716.

At decision operation 716, a determination is made whether a match is found based on the mapping using the equivalence and dynamic custom tables. If the decision is affirmative, a match is recorded in following operation 718. Otherwise, processing moves to operation 720.

At operation 720, the character is mapped via the digit mapping table. The digit mapping table is used to map characters to the digits 0 through 9. Digit mapping table is typically used in phone keypad style inputs. Processing moves from operation 720 to decision operation 722.

At decision operation 722, a determination is made whether a match is found based on the mapping using the digit mapping table. If the decision is affirmative, a match is recorded in following operation 724. Otherwise, processing moves to operation 726.

At operation 726, the user is informed that no match has been found in the dial list. The match operations 706, 712, 718, and 724 are followed by a repeat of process 700 for the next character. As more characters are entered, the number of tracked names from the list is reduced until a single name is found or the entered characters are completed. In the latter case multiple possible matches may be provided to the user.

While the above process is described using a dial list as an example, embodiments are not so limited. Other embodiments matching keyboard entries to textual data may be implemented based on the described principles.

The operations included in process 700 are for illustration purposes. Matching user inputted characters to characters in names may be implemented by similar processes with fewer or additional steps, as well as in different order of operations using the principles described herein.

This detailed description is presented largely in terms of block diagrams, architecture diagrams, and flowcharts. Indeed, such descriptions and representations are the type of convenient labels used by those skilled in integrated circuit design arts to effectively convey the substance of their work to others skilled in the art. A person skilled in the art of computer programming may use these descriptions to readily generate specific instructions for implementing devices according to the embodiments.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for filtering inputs from a plurality of keyboards, comprising:

receiving a first keyboard input;

determining an applicable key mapping table from a plurality of key mapping tables, wherein the applicable key mapping table is associated with a keyboard from which the first input is received;

determining a first set of characters mapped to the received first input; and tracking the determined characters in an accumulated data structure for ascertaining possible matches between the first set of characters in the accumulated data structure and textual data associated with an application.

2. The method of claim 1, further comprising:

receiving a second input from another keyboard;

determining another applicable key mapping table associated with the other keyboard;

determining a second set of characters mapped to the received second input; and tracking possible combinations of the first set of characters and the second set of characters for ascertaining possible matches between the combinations of characters in the accumulated data structure and the textual data associated with the application.

3. The method of claim 2, further comprising:

in response to identifying possible matches between the combinations of characters and the textual data associated with the application, providing a list of suggested matches to a user of the computing device.

4. The method of claim 1, wherein the plurality of key mapping tables include at least one from a set of: an equivalence table for mapping a character to a base character value, a digit mapping table for mapping a character to one of a set of digit between 0 and 9, and a dynamic custom table for mapping a character that has already been mapped by the equivalence table to an alternate character.

5. The method of claim 4, further comprising:

modifying contents of at least one of the equivalence table, the digit mapping table, and the dynamic custom tables in response to a modification request.

6. The method of claim 5, wherein the modification request is received from a user of the computing device as part of a customization process.

7. The method of claim 5, wherein the modification request is received as part of a configuration update process.

8. The method of claim 1, further comprising:

providing a feedback to a user of the computing device based on the tracked characters.

9. The method of claim 5, wherein the plurality of keyboards includes at least one from a set of: a standard keyboard, an enhanced keyboard, a reduced keyboard, a soft keyboard, and a 12-key telephonic keypad.

10. A computer-readable medium having computer executable instructions for providing smart filtering of keyboard inputs in a multi-keyboard environment, the instructions comprising:

in response to receiving a keyboard input that includes one or more characters, determining one or more matching portions of a list of textual entries in a list;

tracking at least one from a set of: a starting character of each matching portion of the list of textual entries, a number of characters in each matching portion of the list of textual entries, the characters of the keyboard input, and a number of the characters of the keyboard input that cause a match;

mapping each character of the keyboard input to a character of each of the matching portion of the list of textual entries based on the tracking; and displaying on an accumulator UI the mapped matching portions of the list of textual entries.

11. The computer-readable medium of claim 10, wherein the instructions further comprise:

if a new matching portion is similar to a previous matching portion caused by the same keyboard input, discarding the new matching portion; and if a mapping table used for mapping the characters of the keyboard input to the characters of the matching portions of the list of textual entries is modified, discarding all matching portions and remapping the characters of the keyboard input.

12. The computer-readable medium of claim 10, wherein the instructions further comprise:

storing the matching portions in an accumulator data structure, and wherein the accumulator data structure includes one of a predetermined number of arrays and a dynamic number of arrays of characters mapped from the keyboard input that cause a match to the list of textual entries.

13. The computer-readable medium of claim 10, wherein the list of textual entries includes a contacts list comprising names.

14. A system for filtering inputs from a plurality of keyboards, comprising:

a plurality of device drivers configured to provide an initial key mapping table for the plurality of keyboards;

a smart filter API configured to:

manage one or more mapping tables to determine matches between characters received from keyboard inputs to characters in a list of textual entries, to map each received character to a character in a matching textual entry, and to track possible combinations of characters for determining the matches.

15. The system of claim 14, wherein the one or more mapping tables include at least one from a set of: an equivalence table for mapping a character to a base character value, a digit mapping table for mapping a character to one of a set of digit between 0 and 9, and a dynamic custom table for mapping a character that has already been mapped by the equivalence table to an alternate character, and wherein the mapping tables are stored in one of a binary file and a registry to be distributed to at least one client process for use by the smart filtering API.

16. The system of claim 15, wherein the one or more mapping tables are arranged to be modified in the registry in response to an update from one of a system administrator and a configuration manager.

17. The system of claim 15, wherein the dynamic custom table is arranged to be updated in a volatile registry in response to one of addition and removal of a keyboard, and wherein the at least one client process is updated based on the changes to the dynamic custom table by a monitor and update module.

18. The system of claim 14, further comprising:

a character accumulator UI configured to provide feedback to a user of the system based on the tracked possible combinations of characters.

19. The system of claim 18, wherein the character accumulator UI is further configured to display combinations of characters that match any one of the textual entries.

20. The system of claim 18, wherein the character accumulator UI is displayed in conjunction with a number accumulator UI configured to display digits corresponding to the keyboard inputs.

* * * * *